Figure 4:
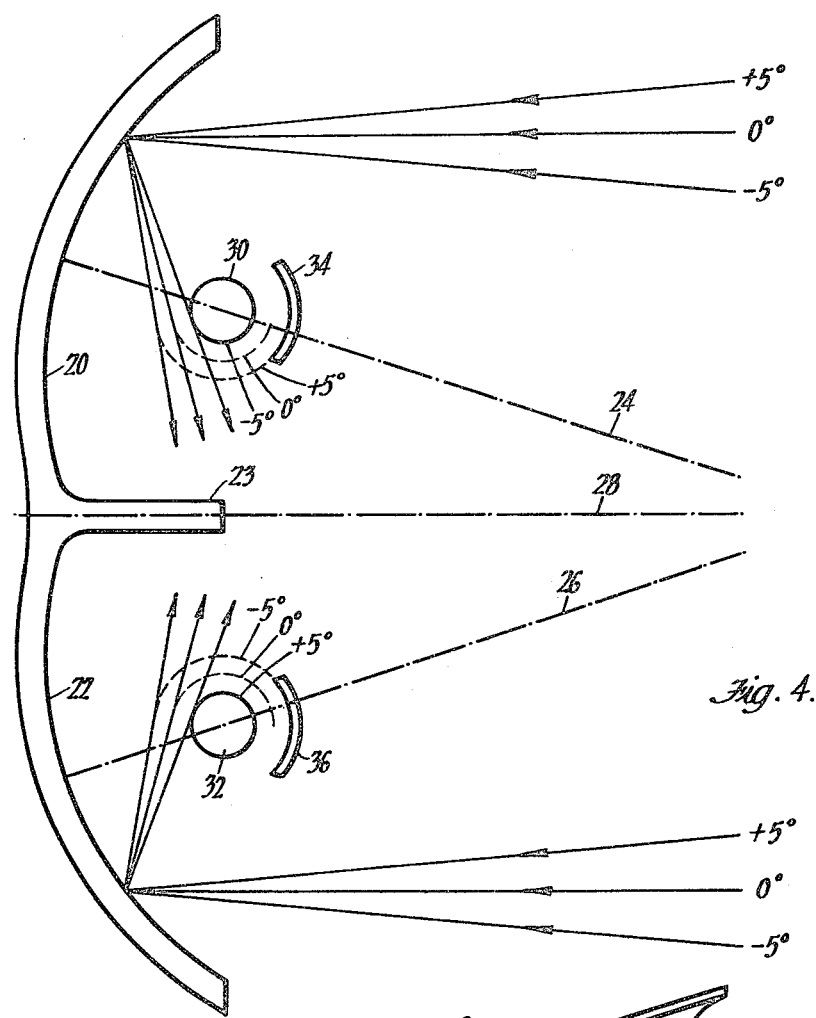

United States Patent [19]

Trihey

[11] 4,089,323
[45] May 16, 1978

[54] SOLAR TRACKING DEVICE

[75] Inventor: John Massey Trihey, Bayswater, Australia

[73] Assignee: Malz Nominees Pty. Ltd., Victoria, Australia

[21] Appl. No.: 704,674

[22] Filed: Jul. 12, 1976

[51] Int. Cl.² .............................................. F24J 3/02
[52] U.S. Cl. ..................................... 126/270; 126/271
[58] Field of Search ............... 126/270, 271; 237/1 A; 353/3; 136/89 PC; 244/168

[56] References Cited

U.S. PATENT DOCUMENTS

| 2,141,330 | 12/1938 | Abbot | 126/271 |
|---|---|---|---|
| 2,712,772 | 7/1955 | Trombe | 353/3 |
| 2,999,943 | 9/1961 | Geer | 60/641 X |
| 3,515,594 | 6/1970 | Samuels | 126/270 X |
| 3,982,526 | 9/1976 | Barak | 126/270 |
| 4,022,185 | 5/1977 | Von Hartitzsch | 126/271 |

Primary Examiner—William F. O'Dea
Assistant Examiner—Larry Jones
Attorney, Agent, or Firm—Cushman, Darby & Cushman

[57] ABSTRACT

Solar energy converting apparatus is disclosed which comprises:
(a) focussing means having a focal plane;
(b) solar energy absorbing means located along the focal line of the focussing means;
(c) a support structure including mounting means for rotating the focussing means about an axis which is co-incident with the focal line of the focussing means; and
(d) solar tracking means having an optical plane which is parallel to said focal plane, said tracking means including two heat extensible members which are arranged to receive equal amounts of heat from solar energy when the optical plane is directed at the sun and to receive unequal amounts of heat from solar energy when the optical plane is not directed at the sun, said extensible members being coupled to act between the support structure and the focussing means to cause rotation of the focussing means in accordance with the heat received by respective extensible members.

Thus the energy required for tracking the sun is derived directly from the received solar energy.

12 Claims, 13 Drawing Figures

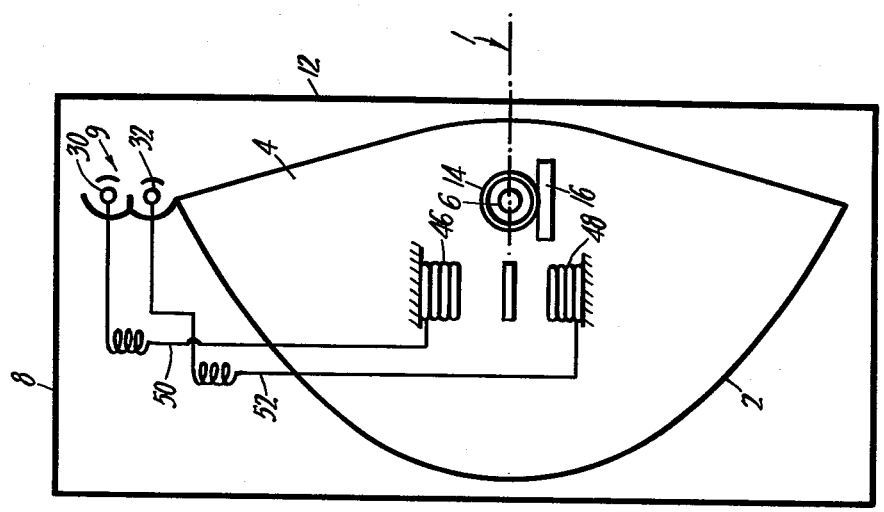
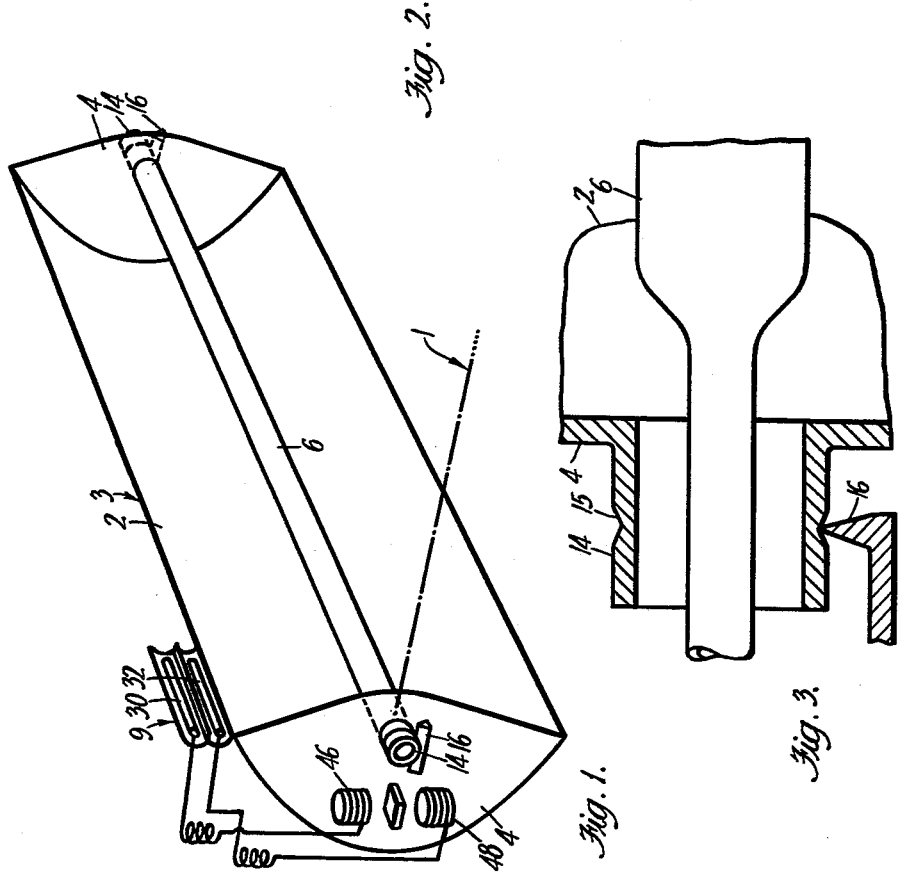

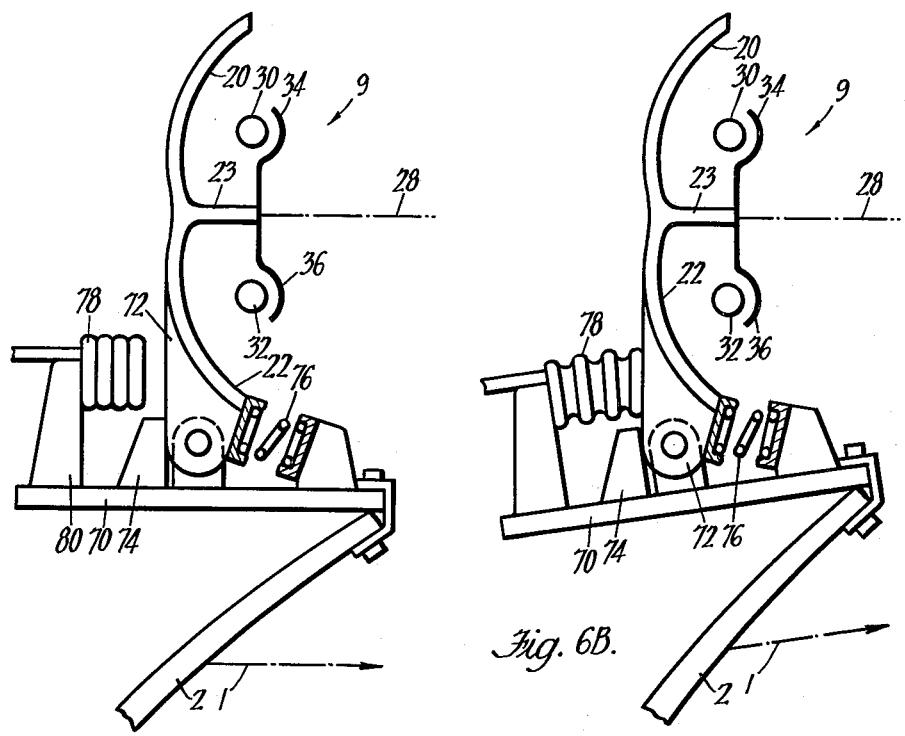
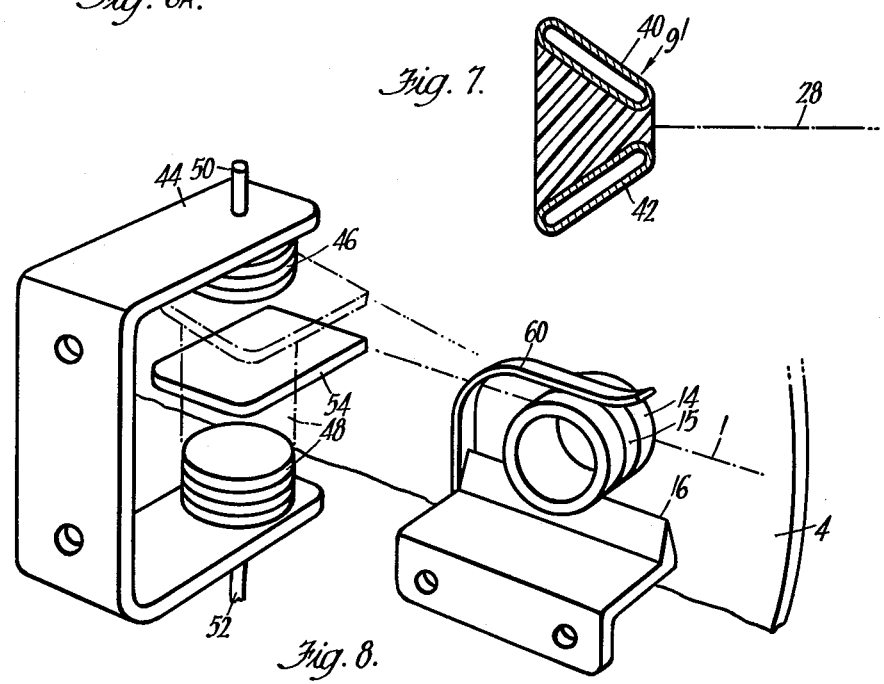

SOLAR TRACKING DEVICE

This invention relates to a solar tracking device and a solar energy converting apparatus incorporating the device.

In Australian patent application No. 79567/75 there is disclosed a solar energy converting apparatus having means for tracking movement of the sun. While this apparatus has many advantages over other known forms of apparatus, it does have the drawback that it requires an external power source to provide power to drive the motors which cause tracking movements to be made. The main object of the present invention is to provide a solar tracking device in which tracking movements are powered by energy derived from the sun, so that external power sources are not required. When the device is coupled with solar energy converting means, such as focussing means and a heat transfer means located at the focus of the focussing means, the device can be mounted on the focussing means so that the focussing means also tracks the sun. Where the heat transfer system includes a heat transfer liquid a heatpowered pump, for instance, of the type disclosed in Australian patent application No. 12116/76 can be used to pump the heat transfer liquid. Such a system is completely self contained in that power for both tracking the sun and pumping the heat transfer liquid is derived directly from the sun.

According to the present invention there is provided solar energy converting apparatus comprising:

(a) focussing means having a focal plane;
(b) solar energy absorbing means located along the focal line of the focussing means;
(c) a support structure including mounting means for rotating the focussing means about an axis which is co-incident with the focal line of the focussing means; and
(d) solar tracking means having an optical plane which is parallel to said focal plane, said tracking means including two heat extensible members which are arranged to receive equal amounts of heat from solar energy when the optical plane is directed at the sun and to receive unequal amounts of heat from solar energy when the optical plane is not directed at the sun, siad extensible members being coupled to act between the support structure and the focussing means to cause rotation of the focussing means in accordance with the heat received by respective extensible members.

It is to be understood that, in relation to tracking about a single axis, the expression "directed at the sun" means that the optical plane of the tracking means lies in the plane which contains the tracking axis and the sun. Further, it is to be understood that an additional pair of heat extensible elements could be provided to accomplish bi-directional tracking.

Figure 5:
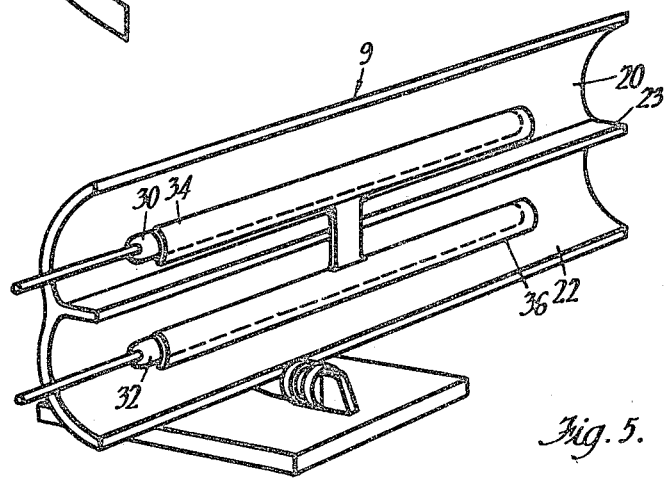
Figure 9:
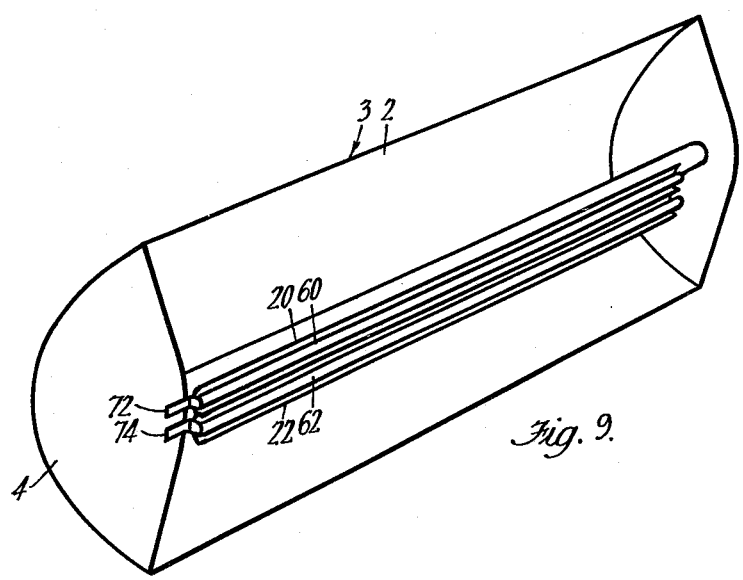
Figure 10:
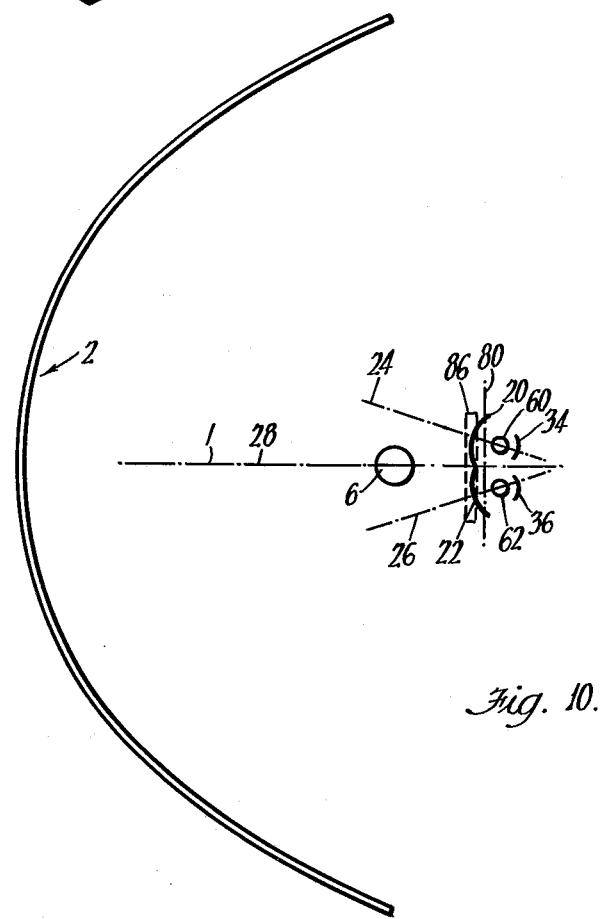
Figure 11:
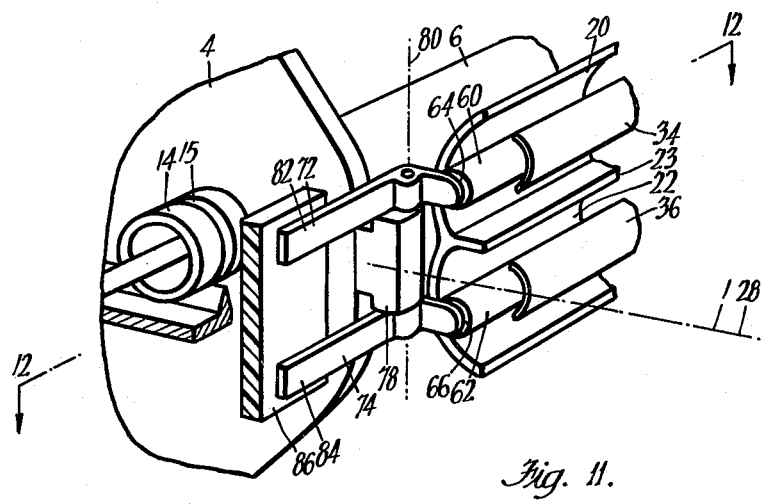
Figure 12:
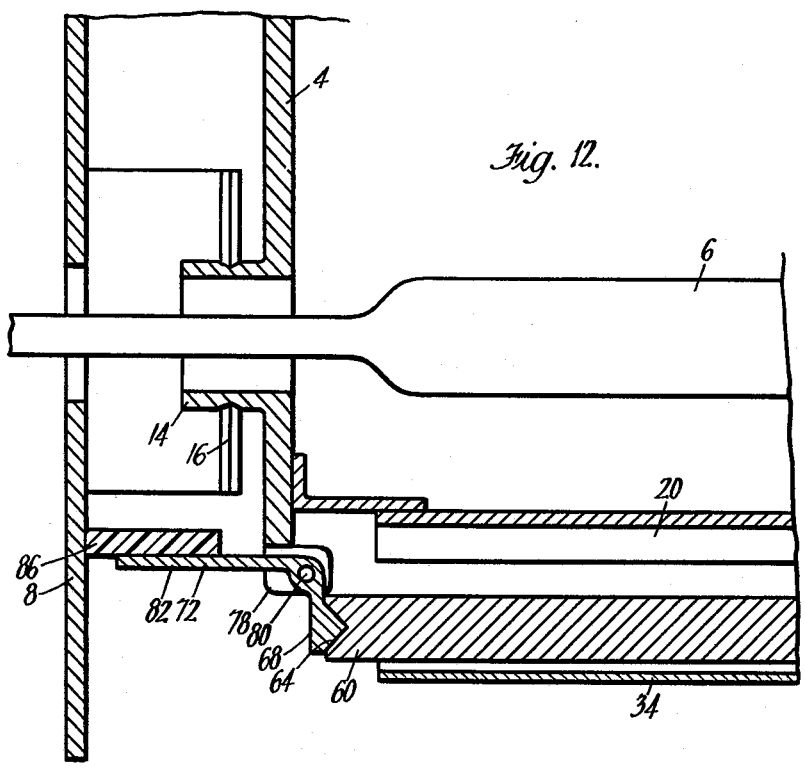

The invention will now be further described with reference to the accompanying drawings, in which :

FIG. 1 is a schematic perspective view of a solar energy converting apparatus incorporating the invention, FIG. 2 is an end view of the apparatus shown in FIG. 1, FIG. 3 is a corss-sectional view through an end of one form of target upon which solar energy is focussed FIG. 4 is a cross-section through a preferred form of tracking device constructed in accordance with the invention, FIG. 5 is a perspective view of a preferred form of tracking device constructed in accordance with the invention, FIGS. 6A and 6B are more detailed end views of the device shown in FIG. 5, FIG. 7 is a cross-sectional view of a different form of tracking device and, FIG. 8 is a more detailed view of part of the tracking device of the invention and its coupling to the parabolic reflector of the apparatus of FIG. 1, FIG. 9 is a schematic perspective view of the device mounted upon the trough 3, FIG. 10 is a schematic end view of the arrangement shown in FIG. 9, FIG. 11 is a more detailed perspective view of part of the arrangement shown in FIG. 9, and, FIG. 12 is a cross-sectional view taken along the line 12—12 marked on FIG. 11.

The solar energy converting apparatus shown in FIG. 1 comprises a reflecting trough 3 having a parabolic surface 2 with a principal optical plane 1 and end walls 4. A target tube 6 located along the focal line of the parabolic surface 2 is provided and serves to collect and transmit solar energy to a heat transfer fluid which passes through the tube 6.

The trough is housed within a housing 8 which is generally box shaped and made from sheet metal but having a glass face 12. The end walls 4 of the reflective trough 3 are mounted for rotation relative to the housing 8 by means of cylindrical sleeves 14 which extend outwardly from the end walls 4 of the trough and make rolling contact with respective knife edges 16 each of which is mounted on an end wall of the housing 8. This form of mounting, i.e. rolling contact on a knife edge, is chosen in preference to a pivotal rotation because it is very simple to attain very low frictional forces by this technique. It is necessary, of course, for correct balancing that the centre of gravity of the reflective trough 3 and all parts supported thereby pass through the centres of the sleeves 14. One of the sleeves is grooved at 15 to maintain correct axial spacing on the knife edges 16.

For efficient operation of the apparatus the reflective trough 3 should be mounted and rotated so that the surface of the target 6 always lies along the focal line of the trough. With a trough shaped reflector mounted such that the target 6 extends in the East-West direction it is only necessary to rotate the trough about a single axis to take account of seasonal elevation changes of the sun. The efficiency of the trough can be improved by making the inside surfaces of the end walls 4 highly reflective.

Regardless of the latitude of the site at which the apparatus is to be used, it is only necessary to allow for ± 23° of movement about a mean position. At the equator, the mean position is directly overhead whereas, in Melbourne for instance, the mean position is at an elevation of 40°. Thus, the knife edges 16 need only be long enough to permit rolling contact of the sleeves 14 corresponding to a rotation of 46°. The knife edges 16 should be mounted on the housing 8 in such a way that they can be adjusted so that their edges extend horizontally, regardless of the orientation of the remainder of the housing. For instance, the knife edge 16 may be attached to the housing by means of screws which extend through slots of sufficient length to provide the required adjustment.

The tracking device of the invention enables the reflective trough 3 to be tracked so as to follow the seasonal elevation changes of the sun without the need for an external energy source. Energy derived directly from received solar energy is utilized for this purpose. The tracking device 9 in accordance with the invention is mounted on the reflective trough 3. One form of device 9 is illustrated in greater detail in FIG. 4. The device 9 comprises two parabolic reflecting surfaces 20 and 22 having respective focal planes 24 and 26. The focal planes 24 and 26 are not parallel to the plane of symmetry 28 of the device, but rather converge toward the plane of symmetry 28. The device is mounted on the surface 2 such that its plane of symmetry 28 is parallel to the principal optical plane 1 of the surface 2. The magnitude of angles which the focal planes make relative to the plane of symmetry is not critical to the device, as will be apparent from the description which follows. Associated with each reflecting surface 20 and 22 is a fluid filled bulb 30 and 32, which may be of the type used in the thermostatic control of gas valves in gas appliances. The bulbs 30 and 32 extend along the focal lines of the surfaces 20 and 22. As best seen in FIG. 5, opaque shading members 34 and 36 are associated with the bulb 30 and 32 to prevent direct sun light from falling on the bulbs when the plane of symmetry 28 is directed at the sun. A partition 23 is provided between the surfaces 20 and 23 to prevent light from one surface from impinging upon the bulb of the other surface.

When the plane of symmetry 28 of the device is directed at the sun, solar energy will not be focussed upon the bulbs 30 and 32 since the axes 24 and 25 will not be directed at the sun. Instead, all rays reflected by the surfaces 20 and 22 will pass the bulbs on the chord lines marked 0°, which are both located inwardly of the bulbs. If however the device remains stationary and the sun moves say 5° upwards from the focal plane 28 all rays will pass along the chord lines marked 5°. As can be seen, the +5° chord lines are located beneath the respective 0° chord lines and thus the +5° chord line of the reflecting surface 20 is further spaced from the bulb 30 than its 0° chord line. However, in contrast, the +5° chord line of the reflecting surface 22 falls upon the bulb 32 and thus a significant amount of solar energy is focussed upon the lower bulb 32. Fluid expansion in the lower bulb 32 can be used to re-orient the device so that the focal plane 28 is again directed at the sun.

The operation of the device is similar for say a 5° downward orientation of the sun relative to the focal plane 28. It will be seen that the −5° chord line of the reflecting surface 20 falls on the bulb 30 whereas the −5° chord line of the lower reflector 22 is well clear of the bulb 32. The resultant increased temperature of upper bulb 30 is used to re-orient the device.

The figure of ±5° has been chosen merely for convenience of description. The angular deviation required before one of the bulbs 30 and 32 becomes heated depends upon a number of factors including the orientation of the focal planes 24 and 26, the focal length of the reflecting surfaces 20 and 22 and the physical dimensions and position of the bulbs 30 and 32. Similar results can be achieved if the focal planes 24 and 26 diverge instead of converging.

In an alternative embodiment, the focal planes 24 and 26 may be parallel to the plane of symmetry 28 and the bulbs 30 and 32 can be off-set either both inwardly or outwardly of their respective focal line.

In a still further embodiment, the bulbs may be heated directly by solar radiation and are so shaped that they receive equal amounts of solar radiation when the plane of symmetry of the device is directed at the sun and receive different degrees when the plane of symmetry is not so directed. For instance, in one such device 9' shown in cross-section in FIG. 7, the bulbs could be replaced by two elongated flattened tubes 40 and 42 which converge or diverge at equal angles relative to the plane of symmetry. With this configuration, when the plane of symmetry is not directed at the sun the projected areas, relative to the direction of the sun, are not equal thereby resulting in a difference of temperatures of the fluid within the tubes and enabling tracking movements to be made.

FIG. 8 illustrates one technique for causing the tracking movements of the surface 2 to be made. In this arrangement a U-shaped yoke 44 is connected to an end wall of the housing 8. An expandible bellows 46 and 48 is connected in the inward side of each leg of the yoke 44, and each bellows has a conduit 50 and 52 for fluid communication with the interior of the bellows. A projecting arm 54 is mounted on the end wall 4 of the surface 2 and its free end is located between the bellows 46 and 48.

The geometry of the arrangement is such that vertically directed forces on the arm 54 cause the sleeves 14 to roll on the knife edges 16 and, consequently alter the direction of the optical plane 1 of the parabolic surface 2. Fluid expansion within the bellows 46 and 48 causes extension thereof to engage and move the arm 54 to accomplish shifting of the optical plane 1 of the parabolic surface 2. With the tracking device 9, the conduit 50 is connected to the bulb 32 and the conduit 52 is connected to the bulb 30. When the plane of symmetry 28 (and consequently the optical plane 1) is directed at the sun neither of the bulbs will be heated appreciably and the bellows 40 and 48 will be retracted, when however the sun's rays are directed upwardly, relative to the plane of symmetry 28, the bulb 30 will quickly heat up and will cause expansion of the bellows 48. The bellows will expand and move the arm 54, as seen in broken lines in FIG. 8, until the plane of symmetry 28 is again directed at the sun whereupon the bulb 30 no longer receives intense heating from the surface 20 and thus the bellows 48 retracts. The arm 54 remains at the point where the bellows 48 retracted and thus the optical plane 1 is directed at the sun and maximum solar energy is received by the target 6. If there is any overshoot, the bellows 46 will operate to correct this.

As described above, once the plane 28 is directed at the sun the bellows 46 and 48 will be retracted and the trough will remain stationary. It is important therefore that, the trough 3 be correctly balanced on the knife edges 16. Further, it may be desirable to damp movement of the trough so that it is not displaced by small disturbances, such as vibration of the housing 8 caused by wind forces. A small leaf spring 60 contacting the sleeve 14 may be provided to place a small amount of static friction on the trough to reduce the possibility of inadvertent movement.

To account for any thermal inertia of the system or any small residual misalignments between the planes 1 and 28, the target 6 can be made relatively large i.e. of sufficient size that substantially all rays received by the surface 2 impinge on the target even with say 5° of misalignment between the plane 1 and 28. Similar effects can be achieved by pivotally mounting the surface 2 about a point spaced somewhat inwardly from its focal line, rather than pivotally mounting it about its focal line.

For the device 9', as illustrated in FIG. 7 the coupling arrangement to the arm 54 could be the same as that shown in FIG. 8. The coupling could, however, in this case be improved by providing compression springs between the inner ends of the bellows 46 and 48 and the upper and lower surfaces of the arm 54. Springs can be used in this arrangement because throughout normal operation both of the tubes 40 and 42 will receive solar energy, and the bellows 46 and 48 will accordingly be at least partly extended.

FIGS. 6A and 6B show a form of mounting of the device on the surface 2 such that excessive temperatures are not generated at the target 6. Generally speaking, means is provided to mis-align the planes 1 and 28 when excessive temperatures are sensed, say in the liquid inlet to target 6 or other convenient locations.

The mounting arrangement comprises a base 70 attached to the upper edge of the parabolic surface 2. Pivotally mounted upon the base is a bracket 72 to which the surfaces 20 and 22 are connected. The bracket 72 is normally biassed in an anticlockwise direction (as seen in FIGS. 6A and 6B) into engagement with an abutment 74 by a compression spring 76. In this position, the plane 28 is parallel to the plane 1. To the rear of the bracket 72 is located a bellows 78 which is connected to a member 80 which projects from the base, the arrangement is such that when an excessive temperature is reached in the heat transfer fluid, the bellows 78 extends and rotates the bracket 72 relative to the base 70, as seen in FIG. 6B. The planes 28 and 1 are now no longer parallel.

Once the bracket 72 has been rotated the plane 28 will initially be not directed at the sun but heating of the bulb 32 will occur and will cause the bellows 46 to operate until the plane 28 is again directed at the sun. The plane 1 is now mis-aligned with the direction of the sun and heat is not focussed on the target 6 by the surface 2. Other techniques are possible for causing defocussing to prevent over-heating but the one described above has the advantage that the bulbs 30 and 32 are not constantly irradiated while the main reflecting surface is out of alignment with the sun.

The degree of extension of the bellows 28 has been exaggerated in FIG. 8 for clarity. In practice, the device can be made operable with quite small degrees of extension by arranging for the bellows to be close to the sleeves 14.

Many modifications and refinements may be made to the apparatus, for instance, the trough 3 and its mountings could be made somewhat more robust to remove the need for housing 8. The presence of the shading elements 34 and 36 is not essential to the working of the device.

The bulbs 30 and 32 need not be along the true focal lines of their respective surfaces 20 and 22. Indeed, if the bulb 30 is shifted outwardly and upwardly, relative to its focal line the chord lines can be made to more closely approximate arcs of circles (as seen in cross-section) and thus, more of the suns rays will be incident upon the surface of the bulb 30. The same applies for the bulb 32 if it is shifted outwardly and downwardly, relative to its focal line.

In a modified arrangement, the fluid systems could be replaced by solid bodies, and reliance could be placed upon thermal expansion of the solid bodies to effect tracking movements of the device. For instance, in the arrangement of FIG. 4, the bulbs 30 and 32 could be replaced by metallic rods, one of which will be intensely heated when the plane 28 is not directed at the sun. The resultant thermal expansion in that rod can be mechanically coupled to rotate the trough 3 in the required manner. It will be appreciated that thermal expansion in a rod can be used to generate large forces, if necessary, which can be used to effect the tracking movements of the trough. In still further forms the rods could be replaced by bi-metallic elements to produce more pronounced expansions.

In the arrangement illustrated in FIGS. 9 to 12, the surfaces 20 and 22 extend across the front of the trough 3 just forwardly of the target 6 and the plane of symmetry 28 of the tracking device is coincident with the optical plane 1 of the trough. The bulbs 30 and 32 are replaced by elongated metal rods 60 and 62 one end of each of which is fixed relative to the trough 3 and the other end of each of which is free to move, axially following thermal expansion of the rods. As best seen in FIG. 12 the free end of each rod is countersunk and the countersunk ends co-operate with conical projections 64 and 66 provided on the shorter legs 68 and 70 of L-shaped levers 72 and 74. The levers 72 and 74 are pivotally mounted to a boss 78 located on a forward portion of the end wall 4 of the trough 3 for rotation about an axis 80, which is normal to the optical plane 1 of the surface 2. The longer legs 82 and 84 of the levers 72 and 74 extend generally parallel to their respective rods 60 and 62 and co-operate with a flange 86 projecting from the inner surface of an end wall of the housing 8. The arrangement is such that when the plane of symmetry 28 is not directed at the sun one or other of the rods 60 or 62 is intensly heated and thermal expansion of that rod causes clockwise rotation (as seen in FIG. 12) of its associated lever. Anticlockwise rotation of the lever 72 will cause clockwise rotation of the surface 2 (as seen in FIG. 10) whereas anticlockwise rotation of the lever 74 will cause anticlockwise rotation of the surface 2 (as seen in FIG. 10) so that, in this way, tracking movements can be made. Light biasing springs could be provided to bias the conical projections 64 and 66 into the countersunk ends of their associated rods 60 and 62. It is equally possible to arrange for the levers 72 and 74 to rotate about horizontal axes and engage a flange or flanges which extend horizontally to effect the required rotation.

In a slightly modified arrangement both the levers 72 and 74 can be made to act upon the flange 86 simultaneously so as to hold the trough 3 steady when subjected to wind forces. Both rods can be heated simultaneously by omitting the shading elements 34 and 36 and by defocussing, i.e. locating the rods 60 and 62 at off-set positions relative to the focal lines of the surfaces 20 and 22. One of the rods will be more intensely heated than the other when the plane 28 is not directed at the sun and thus its expansion will be dominant. Resilient means could be incorporated into the arrangement to prevent damage to the device, for instance, the levers 72 and 74 may act upon the flange 84 through compression springs, or the fixed ends of the rods 60 and 62 could be connected via springs to the trough 3.

The device described about has the advantage that the weight of the rods serves as a counterbalance for the weight of the reflecting surface 2.

I claim:

1. Solar energy converting apparatus comprising:
   (a) focussing means having a focal plane;
   (b) solar energy absorbing means located along the focal line of the focussing means;
   (c) a support structure including mounting means for rotatably mounting the focussing means about an axis which is co-incident with the focal line of the focussing means; and
   (d) solar tracking means having an optical plane which is parallel to said focal plane, said tracking means including first and second heat extensible members which are arranged to receive equal amounts of heat from solar energy when the optical plane is directed at the sun and to receive unequal amounts of heat from solar energy when the optical plane is not directed at the sun, said extensible members being coupled to act between the support structure and the focussing means to cause rotation of the focussing means in accordance with the heat received by respective extensible members, and wherein the tracking means includes first and second fluid expandable bellows which are coupled to first and second fluid filled elements respectively and first and second focussing elements, the first and second fluid filled elements being located at the focal lines of the first and second focussing elements respectively.

2. Apparatus as claimed in claim 1 wherein the focussing elements comprise trough-shaped parabolic reflectors which are symmetrically disposed about the optical plane of the solar tracking means but their focal planes are off set relative to said optical plane.

3. Apparatus as claimed in claim 2 wherein the focal planes of the reflectors both converge toward or both diverge away from the optical plane.

4. Apparatus as claimed in claim 2 wherein shading means are located distal of the parabolic reflectors and fluid filled elements, the shading means shading the fluid filled elements from direct solar energy.

5. Apparatus as claimed in claim 4 wherein the support structure comprises a housing within which the focussing means and tracking means are located, and said bellows are mounted on the housing and act upon a flange which projects from the focussing means.

6. Apparatus as claimed in claim 2 wherein the parabolic reflectors are carried by said focussing means, and the tracking means includes adjusting means sensitive so the temperature of said solar energy absorbing means and operable to misalign the parabolic reflectors relative to the focal plane of the focussing means.

7. Solar energy converting apparatus comprising:
   (a) focussing means having a focal plane;
   (b) solar energy absorbing means located along the focal line of the focussing means;
   (c) a support structure including mounting means for rotatably mounting the focussing means about an axis which is co-incident with the focal line of the focussing means; and
   (d) solar tracking means having an optical plane which is parallel to said focal plane, said tracking means including first and second heat extensible rods which are arranged to receive equal amounts of heat from solar energy when the optical plane is directed at the sun and to receive unequal amounts of heat from solar energy when the optical plane is not directed at the sun, said extensible rods being coupled to act between the support structure and the focussing means to cause rotation of the focussing means in accordance with the heat received by respective extensible rods and wherein the tracking means includes first and second focussing elements, the first and second heat expandable rods being located at the focal lines of the first and second focussing elements respectively.

8. Apparatus as claimed in claim 7 wherein the focussing elements comprise trough-shaped parabolic reflectors which are symmetrically disposed about said optical plane but their focal planes are off set relative to said optical plane.

9. Apparatus as claimed in claim 8 wherein the focal planes both converge toward or diverge away from the optical plane.

10. Apparatus as claimed in claim 9 wherein the support structure comprises a housing within which the focussing means and tracking means are located and wherein one end of each rod is fixed relative to the focussing means and the free ends are engageable with first and second levers pivotally carried by the focussing means, said levers co-operating with a flange or flanges projecting from the housing.

11. Apparatus as claimed in claim 8 wherein shading means are located distal of the parabolic reflectors and fluid filled elements, the shading means shading the fluid filled elements from direct solar energy.

12. Apparatus as claimed in claim 8 wherein the parabolic reflectors are carried by said focussing means, and the tracking means includes adjusting means sensitive to the temperature of said solar energy absorbing means and operable to misalign the parabolic reflectors relative to the focal plane of the focussing means.

* * * * *

UNITED STATES PATENT OFFICE
CERTIFICATE OF CORRECTION

Patent No. 4,089,323                              Dated May 16, 1978

Inventor(s) John Massey Trihey

It is certified that error appears in the above-identified patent and that said Letters Patent are hereby corrected as shown below:

On the front page format, after paragraph "[22]",
insert:   --[30]  Foreign Application Priority Data
          July 11, 1975    Australia.........PC 2334

*Signed and Sealed this*

*Twenty-second* Day of *May 1979*

[SEAL]

Attest:

RUTH C. MASON
*Attesting Officer*

DONALD W. BANNER
*Commissioner of Patents and Trademarks*